UNITED STATES PATENT OFFICE.

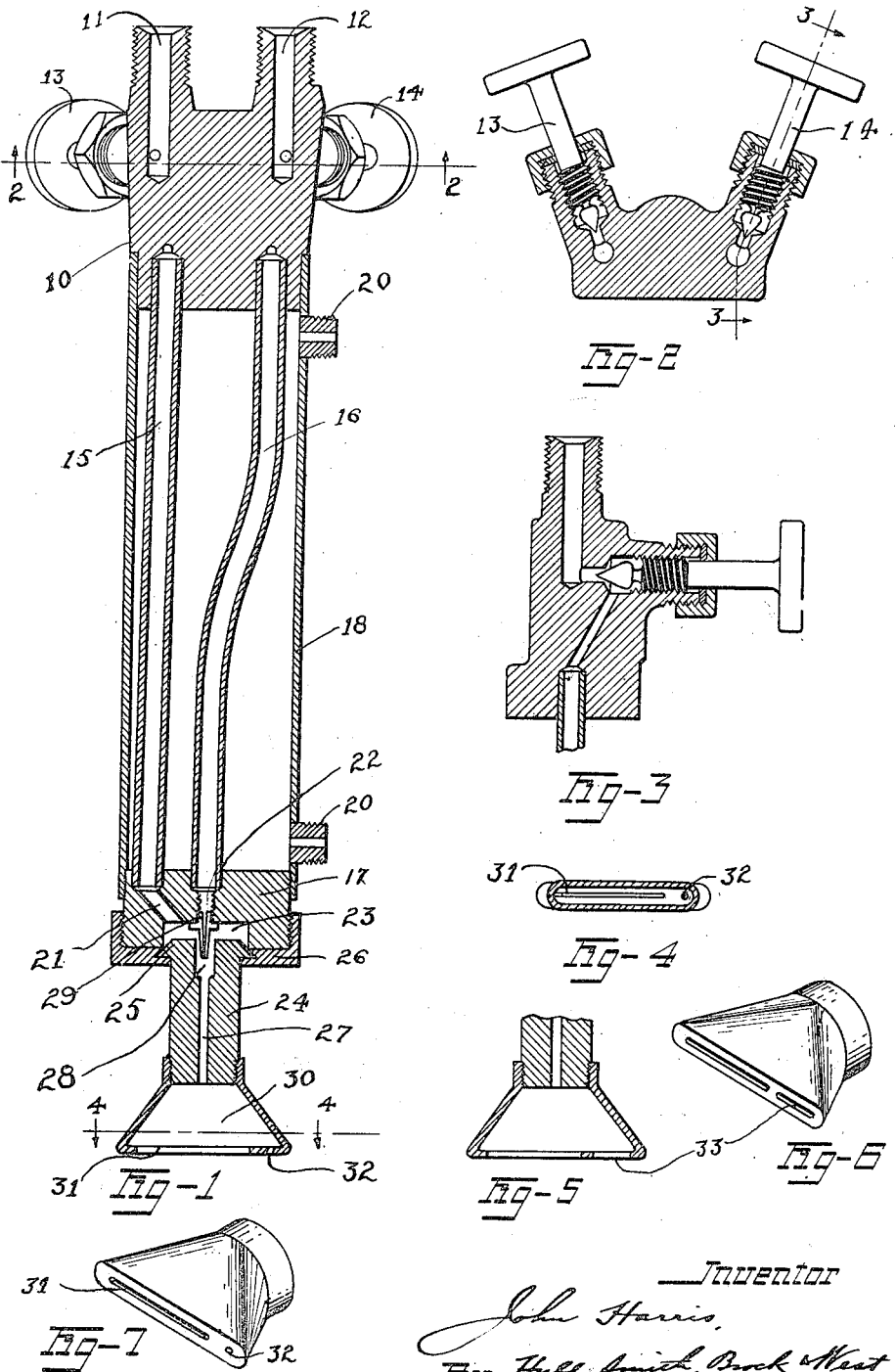

JOHN HARRIS, OF LAKEWOOD, OHIO, ASSIGNOR OF ONE-HALF TO JAMES R. ROSE, OF EDGEWORTH, PENNSYLVANIA.

BLOWPIPE FOR WELDING-MACHINES.

1,288,879.

Specification of Letters Patent. Patented Dec. 24, 1918.

Application filed September 1, 1917. Serial No. 189,241.

*To all whom it may concern:*

Be it known that I, JOHN HARRIS, a citizen of the United States, residing at Lakewood, in the county of Cuyahoga and State of Ohio, have invented a certain new and useful Improvement in Blowpipes for Welding-Machines, of which the following is a full, clear, and exact description, reference being had to the accompanying drawings.

This invention relates generally to blow pipes for welding machines and more particularly to the construction and arrangement of the tip, the object being to improve upon the constructions now in use and produce a more effective and complete weld.

In the blow pipes for welding machines now in use a tip is employed having a plurality of jet openings through which the combustible preheating gas emerges producing a plurality of spaced independent jets, and adjacent to this series of preheating jets is the welding jet.

This form of tip while being efficient to a certain extent is objectionable inasmuch as the series of independent spaced preheating jets permits air, which contains nitrogen, to circulate or be drawn between these separated preheating jets with the result that the preheating is not accomplished as quickly and economically as it should be, and my improvement is devised with the idea of overcoming or eliminating just these defects.

This I accomplish by constructing the tip essentially funnel shaped, the bottom thereof being elongated and provided with a long narrow slot through which the preheating gas emerges producing a long thin flame which impinges against the entrance or egress of air and consequently eliminates the deleterious effect of nitrogen contained in the air.

Adjacent to the slot for the preheating gas is a small opening for the welding flame and this opening is made at such an angle that the welding jet will be directed obliquely toward the line of weld and converging toward the preheating flame.

The invention embraces other features of construction and arrangement hereinafter more fully described and pointed out in the claims.

In the drawings forming a part of this specification I have shown one form of carrying out my invention but it will be understood that other forms may be employed within the scope of the appended claims without departing from the broad principles of the invention.

In these drawings Figure 1 is a vertical sectional view of a blow pipe constructed in accordance with my invention; Fig. 2 is a horizontal section on the line 2—2 of Fig. 1; Fig. 3 is a detail section on the line 3—3 of Fig. 2; Fig. 4 is a horizontal section on the line 4—4 of Fig. 1; Fig. 5 is a vertical sectional view of a slightly modified form of tip; Fig. 6 is a detail perspective view of the same; and Fig. 7 is a detail perspective view of the tip illustrated in section in Figs. 1 and 4.

In constructing a blow pipe in accordance with my invention I employ a valve casting 10 having passages 11 and 12 bored therein, and with which communicate the acetylene and oxygen supply pipes and the passage of these gases through the casting is controlled by the valves 13 and 14 respectively.

15 indicates the acetylene pipe and 16 the oxygen pipe leading from the valve casting the lower ends of these pipes being rigidly secured to a circular block 17 spaced any suitable distance from the valve casting and secured by means of a surrounding sleeve 18 having water inlet and outlet connections 20 so that water can be introduced for the purpose of cooling the pipe when desired.

The lower end of the pipe 15 communicates with an inclined passage 21 while the lower end of the pipe 16 communicates with a central vertical passage 22 produced in the block 17, both of these passages 21 and 22 in turn communicating with a chamber 23 formed centrally in the bottom of the block 17 and connected to this block 17 at the bottom of the recess 23 is a nozzle 24, the upper end thereof being enlarged and tapered as shown at 25, said enlarged and tapered end seating in a gasket 26 which is secured to the end of the block 17 for the purpose of uniting the nozzle to the block. This nozzle has a central bore 27 which is enlarged at its upper end as indicated at 28 and projecting into the upper end of this enlargement of the bore is a small injector nozzle 29 secured into the lower end of bore 22.

The bore 27 extends entirely through the nozzle and secured upon the end of said nozzle is a tip 30, said tip being spread laterally in two directions and contracted in opposed directions so as to provide a tip which is very narrow in line with the proposed line of weld but of considerable length in order to provide a maximum amount of preheating flame and also to provide for the welding jet.

As previously stated it has heretofore been the practice to provide the bottom of the tip with a series of independent and spaced jet openings for the passage of the preheating gas, but in my construction I propose to produce a long narrow slot 31 in the bottom of the tip and adjacent thereto a single opening 32 and it will be noted by reference to Fig. 1 that this opening 32 is inclined so as to direct the flame toward the flame produced by the combustion of the gas issuing through the elongated slot 31.

In Figs. 1, 4 and 7 I have shown a circular opening 32 employed in combination with the elongated slot 31, but if desired a similar elongated opening such as shown at 33 in Figs. 5 and 6 may be employed with equally good results.

By means of the nozzle connection effected in the manner shown its tip can be quickly and easily turned to any desired angle.

In operation, the acetylene and oxygen are commingled as they enter and pass through the nozzle 24 and the gases thus commingled and mixed are projected through the elongated slot 31 and the adjacent opening 32 and are ignited at these points with the result that there is produced a single long narrow preheating flame and a single welding flame adjacent thereto.

A tip constructed as herein shown and described completely eliminates the defects of the tip having a series of independent jets.

Having thus described my invention, what I claim is:—

1. In a blow pipe for welding machines, a tip having an elongated slot for the preheating flame and a single discharge opening for the welding flame.

2. In a blow pipe for welding machines, a tip having an elongated slot for the preheating flame and a single discharge opening for the welding flame, said single discharge opening being arranged adjacent to the end of said slot and shaped to direct the welding flame toward the preheating flame.

3. In a blow pipe for welding machines, a tip having an elongated slot and a single opening adjacent to said slot, a nozzle to which said tip is connected, together with means for supplying gas to said nozzle.

4. In a blow pipe for welding machines, a tip having an elongated slot and a single discharge opening, a nozzle discharging into said tip, means for supplying gases to said nozzle, said nozzle being adjustable with reference to said means whereby the slot of the tip can be adjusted to any desired angle.

5. In a blow pipe for welding machines, a tip contracted in one direction thereby providing an elongated tip, an elongated slot in the bottom thereof and a single opening adjacent to the end of said slot, a nozzle connected to said tip and discharging thereinto, a block to which said nozzle is connected and gas tubes communicating with said block and supplying commingled gases to the nozzle.

6. In a blow pipe for welding machines, the combination with a tip having an elongated slot and a single discharge opening, a nozzle to which said tip is connected, said nozzle having a central bore, the upper end of said bore being enlarged and providing a mixing chamber, a block to which said nozzle is connected, said block having gas passages produced therein which passages are adapted to communicate with the enlarged bore of the nozzle and gas supply pipes communicating with said gas passages.

In testimony whereof, I hereunto affix my signature.

JOHN HARRIS.